United States Patent [19]
Myles

[11] 3,751,095
[45] Aug. 7, 1973

[54] UNIVERSAL SUCTION HEAD CONVEYOR

[75] Inventor: Charles E. Myles, St. Louis County, Mo.

[73] Assignee: Alvey, Inc., St. Louis, Mo.

[22] Filed: Sept. 30, 1971

[21] Appl. No.: 185,078

[52] U.S. Cl............................................. 294/64 R
[51] Int. Cl............................................. B66c 1/02
[58] Field of Search........................... 294/64 R, 65; 415/149, 150, 151; 248/362, 363; 271/26; 137/454.2, 519, 526

[56] References Cited
UNITED STATES PATENTS
3,259,417   7/1966   Chapman........................ 294/64 R
FOREIGN PATENTS OR APPLICATIONS
870,524   6/1961   Great Britain....................... 294/65

Primary Examiner—Richard E. Aegerter
Assistant Examiner—Johnny D. Cherry
Attorney—Gravely, Lieder & Woodruff

[57] ABSTRACT

A conveyor suction head assembly operating on the principle of establishing a grip on a load which may be a group or a layer of articles by a differential pressure across the load wherein a plenum chamber is created with a plurality of individually valve controlled pockets capable of establishing surface contact with the load to be transported and, thereby establishing an operating condition where the plenum chamber when reduced to a negative atmospheric condition will establish the pressure differential across the load or layer of articles which are normally at ambient pressure conditions. In the assembly the respective pockets are equipped with gravity responsive control valves for controlling the effectiveness of the pressure drop across the load, and it is unique that the control valves and the orifices controlled thereby may be easily removed for replacement if different orifice size and different weight of valve elements may be required.

8 Claims, 6 Drawing Figures

3,751,095

3,751,095

UNIVERSAL SUCTION HEAD CONVEYOR

BRIEF BACKGROUND OF THE INVENTION

Suction head devices, per se, are known in this art, and certain thereof have been provided with valve means distributed over the face area of the device to operate to conserve the power consumption when a load covers less than the full area of the device. Such devices have operated in an unsatisfactory and uncertain manner with no positive assurance that the load will be properly engaged and remain firmly gripped at the face of the suction head. Furthermore, prior suction head devices have not been provided with means to break the grip with assurance or in a rapid and positive manner. This latter defect is a drawback when conveying single articles or groups of articles to and from pallets as the dropping of the article or dropping one or more articles of a group, the dropping of articles out of unison, or failure to pick up a complete article or group thereof discombobulates the operations.

The present suction head overcomes the problems of prior devices and incorporates means whereby a load, such as a group of articles, is positively and quickly released as well as firmly and positively gripped, so that the load can be moved with complete assurance. More especially the embodiment herein disclosed exhibits an organization of components which is simple to produce, easy to service when necessary, is lightweight for the load capacity, and is able within reasonable limits to accommodate itself to non-uniformity in the surfaces of articles to be suction lifted. It is a further feature of the preferred embodiment that certain portions are made in such a way that initial assembly as well as repair or interchangeability are easily accomplished.

The universal suction head of this disclosure is provided with a grid face composed of a rectilinear resilient seal member providing a series of valve pockets in front of a bolster plate carried by a plenum chamber of the suction head. Each pocket contains a gravity and pressure responsive valve movable on a guide formed with a bleed passage opening between the pocket and a cavity adjacent to the bolster plate which communicates with the plenum chamber. A fan chamber communicates with the plenum chamber through a valve controlled port at the eye of the fan and through a by-pass valve controlled port spaced from the valve at the fan eye. The improved arrangement of components in the suction head allows the conveyance of one, several or a full complement of articles, and the valve controlled orifices effect the grip or release of such articles thereby assuring desired conveyance and positive release of the articles.

DESCRIPTION OF THE DRAWINGS

The presently preferred embodiment of the universal suction head is illustrated in the accompanying drawings, wherein.

DESCRIPTION OF THE PREFERRED EMBODIMENT

Figure 1:
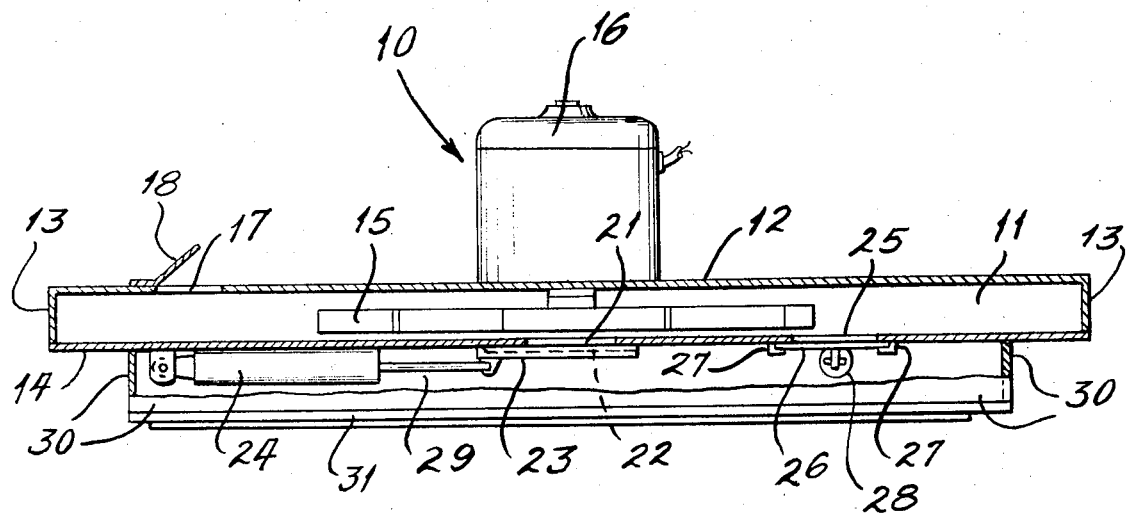
FIG. 1 is an elevational view, partly in section, of the suction head to reveal internal details of portions thereof.

In FIG. 1 there may be seen the suction head assembly 10 which includes a chamber 11 formed between a top wall 12, sidewalls 13 and a bulkhead 14. A fan or impeller 15 is mounted centrally of the chamber 11 and is driven by the motor 16. The top wall has one (or more) exhaust openings 17 with a blast deflector 18 to divert the flow. The assembly 10 may be attached or suspended relative to a conveyor system by cables 19 engaged in terminal units 20 to be referred to presently.

The bulkhead 14 is formed with a port 21 aligned with the eye of the fan 15 and a slide valve plate 22, supported in edge guides 23, is moved as desired by push-pull motor means 24 supported on the bulkhead. A second port 25 in the bulkhead 14 is controlled by a slide valve plate 26 supported in edge guides 27, and moved by push-pull motor means 28. The motor means 24 and 28 are enclosed in a plenum chamber 29 formed by side walls 30 which support a bolster plate 31 spaced from the bulkhead 14. With the motor 16 energized the fan 15 draws a negative pressure in the plenum chamber 29 with the bulk head valve port 25 closed and the fan eye port 21 open. The flow is exhausted through one or more exhaust openings 17.

The suction or negative pressure function of the fan 15 is utilized by forming the plenum chamber bolster plate 31 (FIGS. 2 and 3) opposite the bulkhead 14 with a plurality of holes 32, and forming separate pockets 33 at each hole 32 by a gridwork of yieldable material 34 for the sidewalls. The material 34 may be molded to form "egg crate" squares, with each square centered about a hole 32. In one example there were 20 pockets 33 arranged in rows perpendicular to each other for a total of 400 pockets in the load engaging face.

Figure 2:
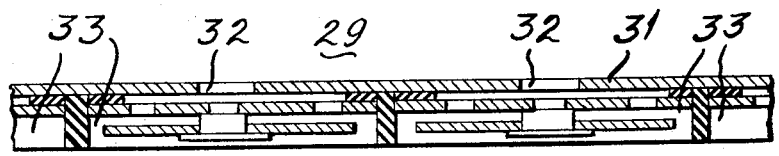
FIG. 2 is an enlarged and fragmentary sectional view of adjacent suction control means which are typical of many such control means in the suction head of FIG. 1.
Figure 3:
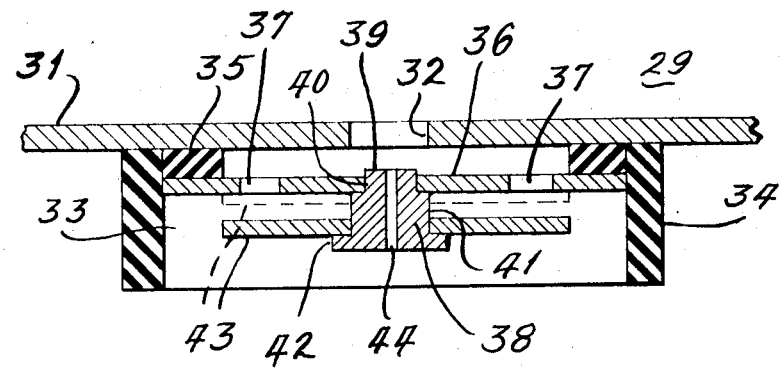
FIG. 3 is a greatly enlarged sectional view of one control means which is typical of all.

In FIGS. 2 and 3, it can be seen that each pocket 33 (square in plan) is formed by adhering the edges of the yieldable molded plastic material 34 to the bolster plate 31, and similarly securing a grommet seal 35 about the interior of the wall material 34 to form a seat for an orifice plate 36. The plate 36 is formed with a cluster of orifices 37 surrounding a central plug 38 having a reduced shank 39 press fitted into the aperture 40. The plug has an enlarged shank portion 41 which terminates in a head flange 42. A gravity responsive control valve disc 43 is loosely mounted over the plug shank 41 so it will be free to assume the full and dotted line positions of FIG. 3. It is noted that the plug 38 is formed with a small bore passage 44 open between the space or cavity above the plate 36 and the space in pocket 33 or the ambient space which is at atmospheric pressure conditions.

The assembly of FIG. 3 which is typical of each, has certain advantages over known assemblies. It is unique to mount the orifice plate 36 by contact adhesive to the seal 35 as it allows the plate 36 to be removed if orifices 37 are to be changed in size or number for altering the operation of the head 10. Also, the plate 36 supports the plug 38 which has a push fit at shank 39 in aperture 40 to allow its removal for assembly of the valve disc which is captured by the head flange 42. Valve discs of various sizes may be used with the assembly as the plug 38 is easily removed for this purpose.

Figure 4:
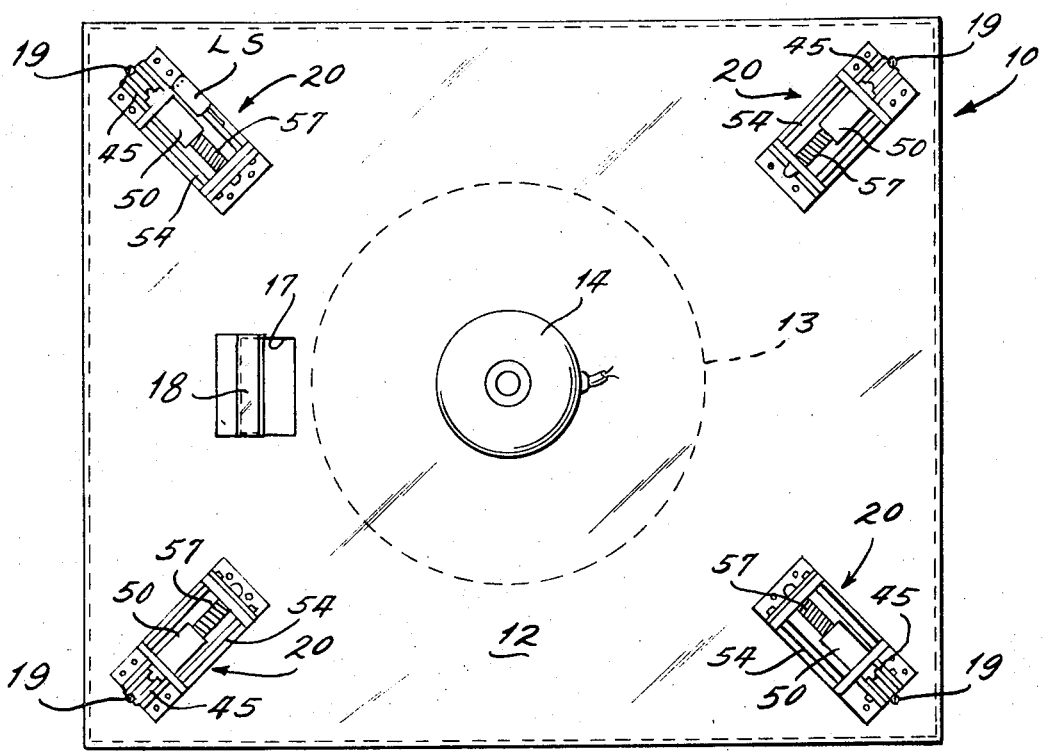
FIG. 4 is a top plan view of the suction head seen in FIG. 1 to illustrate the suspension cable terminal units.
Figure 5:
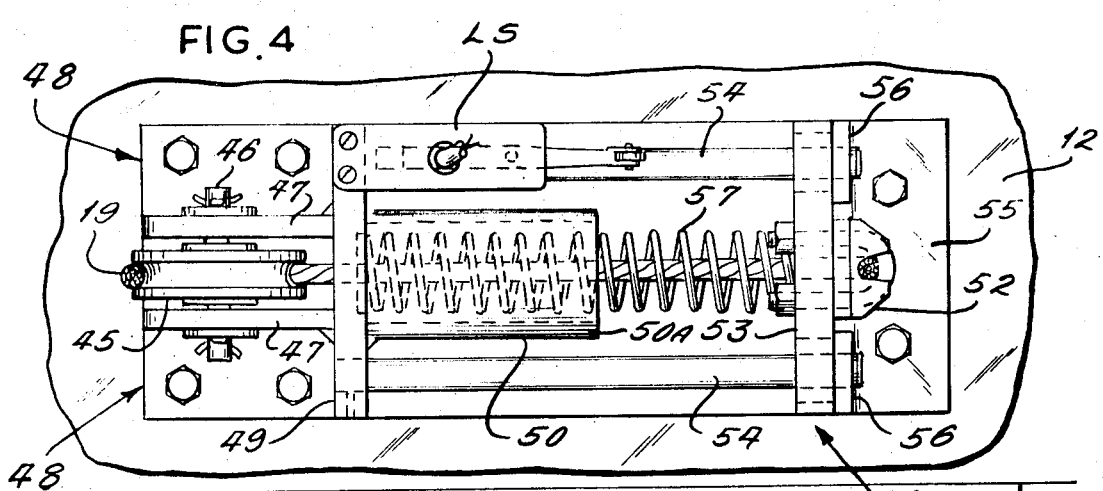
FIG. 5 is an enlarged plan view of a typical cable terminal unit equipped with a limit switch.
Figure 6:
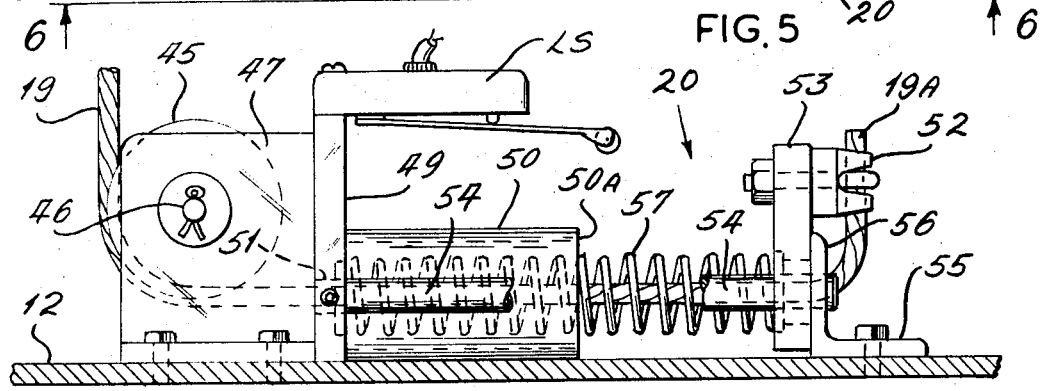
FIG. 6 is an elevational view of the cable terminal unit seen along line 6—6 in FIG. 5.

In FIGS. 4, 5 and 6 there can be seen cable means for accomplishing the movement of the head 10 and also for setting up the control for the air flow control valve plates 22 and 26 of FIG. 1. The respective hoist cables 19 are engaged in units 20, and each such unit is provided with a pulley 45 rotatably supported by shaft 46 in the upstanding legs 47 of a pair of spaced angle members 48. The members 48 are held in spaced relation by a plate 49 and by being secured to the top wall 12 of the head 10. The surface of 49, opposite to the pulley 45 carries a spring guide 50 surrounding an opening 51 for the cable 19 to pass through so its end portion 19A can be clamped by means 52 to the far side of a movable block 53 spaced from the free end of the spring guide tube 50. The block 53 slides on a pair of spaced guide rods 54 so it cannot tilt. The rods 54 are supported at one end in the plate 49 and at the opposite end in an angle plate 55 which has spaced vertical legs 56 so that the clamp 52 for the cable end 19A will move into the space and allow the movable block 53 to be pressed against the legs 56 by a coil spring 57. The block slides on the guide rods 54 between a cable loaded position where the block 53 is pulled by a cable 19 against the free end 50A of the guide tube 50 and a cable relaxed position where the spring 57 has pushed the block 53 against the vertical legs 56 of plate 55. Each unit 20 of FIG. 4 is identical with the unit above described, so that as the weight of the suction head 10 comes onto the cables 19 the units 20 react by having the slide blocks 53 compress springs 57 into the guide tubes 50 in order to reach a solid connection against the ends 50A of the spring guide tube 50.

The relative movement between a slide block 53 and a stationary part of the head 10 is utilized to gain appropriate actuation of a limit switch LS which is connected into a suitable electrical circuit for the various motor means (not shown) consitituting the hoist components. The circuit is of the flip-flop character because some conditions at a loading station are just opposite at an unloading station. The action of switch LS at a loading station is to stop the downward movement of the head 10 approaching a load to be picked up and to reverse the hoist (not shown) for the head so that the head 10 will have as little residual travel as possible coming to a stop and reversing direction. The switch LS also is used to energize a circuit which actuates the motor means 24 and 28 such that these means can be energized to shift the positions of valve plates 22 and 26 when needed. When approaching a load the valve 22 is open and valve 26 is closed so the head sucks up the articles constituting the load. The head 10 moves up until it is programmed to move horizontally, and in moving to an unload station a suitable flip-flop circuit (not shown) is actuated to reverse the hoist motor power circuit so that when the head 10 reaches the unload station it will be lowered until the limit switch LS is actuated to operate the motor means 24 and 28 for shifting valve 22 to close and valve 26 to open, thereby releasing the load from the head 10.

The operation of the head assembly 10, which is suitably suspended as indicated, is initiated by energizing the fan motor 16 so that it may run continuously. After the fan 15 is operating properly the port 21 is opened and port 25 is closed, thereby causing all of the gravity responsive valve discs 43 to be sucked up to the dotted line position of FIG. 3.

In this condition the hoist mechanism (not shown) may be operated to position the suction head assembly 10 over a layer of articles which are to be elevated or transported from one location to another. The operator lowers the suction head assembly 10 until the bolster plate 31 is centered longitudinally and transversely over the layer of articles. During the final lowering operation the grid 34 will yield under the weight of the suction head assembly and accommodate itself to whatever unevenness there may be in the surfaces of the respective articles. Since the plenum chamber 29 is under a reduced or negative pressure the valve discs 43 in any of the pockets 33 which are not completely aligned with an article will remain lifted by the air flow into the dotted line position (FIG. 3) to close the orifices 37 which are the primary air flow passages in the orifice plate 36. This closing function of the valves 43 conserves the negative pressure necessary in chamber 29 so it can be directed to lifting the articles to be transported. Each of the pockets 33 which is aligned over an article will cut-off the high volume flow of air through the pockets 33 and the orifices 37 whereby the gravity responsive valve elements 43 will drop to the fill line position (FIG. 3).

The dropping of the valve elements 43 from the broken line to the full line positions is achieved by reason of the small or secondary air flow passage 44 in the plug 38 which will place the negative pressure of the plenum space 29 in communication with the pocket space 33, and when the pressure in these two spaces is equalized, then the valve element 43 will be free to drop by gravity response. So long as an article remains over the pocket space 33, the article so positioned will adhere to the suction head assembly 10 due to the pressure differential between the ambient pressure and the negative pressure in the plenum chamber 29, which will, of course, be the same as the pressure in each of the pockets 33. The maximum lifting thrust on the layer of articles is achieved with the valve elements 43 at full line position.

After a layer of articles has been transported by the suction head assembly 10 to a desired destination or unloading location, it is a unique feature of the assembly to be able to release the articles substantially instantanously. The release action is obtained by simultaneously energizing motor means 24 and 28 to shift the respective valves so that the port 21 in the eye of the fan 15 is closed and the port 25 is opened. The output of the fan 15 is, therefore, directed into the plenum chamber to raise the pressure therein to above atmospheric and in which situation the respective pockets 33 are pressurized and the layer of articles is literally washed off the face of the assembly with no possibility of residual vacuum or negative pressure causing any of the articles to stick or be delayed in release.

By dividing the working face of the suction head assembly into a grid defining a plurality of separate pockets 33, each being defined by a yieldable wall of suitable material 34, it is possible to conserve the negative suction pressure because the valve 43 in any pocket 33 which does not contact with the surface of an article or which makes an imperfect contact because some portion of the yieldable wall 34 has not touched the article, will be drawn into the dotted line position (FIG. 3) to close off the plurality of orifices 37 and thereby cause the lifting energy of the assembly to be diverted to those pockets 33 which have made proper contact.

In the foregoing description relating to a preferred embodiment of the suction head assembly it has been pointed out that each of the pockets 33 associated with the general plenum chamber 29 is provided with an orifice plate 36 mounted in the pocket by adhesive contact with a grommet seal 35. It has also been pointed out that each valve element 43 which controls the orifices 37 or primary air flow passage in the plate 36 is removably mounted in the plate by a press fitted plug 38. It will appear from the character of the respective components and the assembly thereof in each pocket 33 that the plate 36 in which the orifices 37 are formed may be removed and exchanged for a different plate 36 with different sized orifices 37 or a different number of orifices to suit the desired lifting capacity of the assembly. Furthermore, the removability of plug 38 permits selectivity of the size of the secondary passage 44 as well as selectivity of the weight value for the valve element 43 so as to make it more or less responsive to air flow upwardly in the pockets 33 and through the respective orifices 37. The advantages just detailed would not be available if the plug 38 were carried by the bulkhead 31 and the orifices 37 were formed directly in the bulkhead. A further advantage for the assembly illustrated in FIG. 3 is that if during manufacture of the various components any thereof is found to be warped or nicked or otherwise damaged, it can be discarded at a minimum of expense and rapidly replaced by a proper component.

The suction conveyor described herein may be used to pick up and transfer between loading and unloading stations loads which may be a single object, a group of discrete articles making up a layer or less than a layer, flexible wall containers such as bags, or other objects requiring lifting and moving.

What is claimed is:

1. A suction head assembly for transporting a load from place to place under a pressure differential gripping effect, said assembly including: a plenum chamber having a wall of an area to cover the load to be transported and a plurality of ports distributed in said wall; a grid member on said wall presented toward the load and formed to provide a plurality of pockets for isolating said ports from each other; pressure drop control means in each pocket including a plate having at least one orifice therein, a valve element for said orifice, said valve element having a central aperture, and guide means extending loosely through said central aperture and engaged in said plate for operably mounting said valve element on said plate for movement to cover and uncover said orifice, said guide means having a passage therein communicating between said plenum chamber and said pocket in by-pass of said plate orifice; and fan means communicating with and operable to reduce the pressure in said plenum chamber and initiate a flow of air through said plate orifice to suck up said valve elements over the respective orifices and to conserve the negative pressure in said plenum chamber.

2. The assembly of claim 1 wherein said grid member is formed of a yieldable material to conform to the surfaces of a layer of articles and establish a seal about the periphery of each pocket.

3. The assembly of claim 1 wherein said valve element in each pocket is normally free to uncover said orifices by gravity responsive movement on said guide means, and responds to cover said orifices with said fan operating and no load registered with the pocket.

4. A load handling suction head including an impeller, a housing for said impeller and having a wall with a port adjacent the eye of the impeller in said housing, a plenum chamber in communication with said housing through said wall port, said plenum chamber having an outer wall with a plurality of holes, a grid on the exterior of said outer wall and composed of crossed wall elements defining pockets surrounding each hole, and suction control means in each pocket, each control means comprising a plate spaced from said outer wall and having orifice means therein, a gravity responsive valve having an aperture therein and an annular body controlling said orifice means in said plate, and a support carried by said plate in position to engage in said valve aperture and mount said gravity valve on said plate for movement between a position in which the annular body effectively closes said orifice means in said plate and a position on said support and spaced therefrom for opening said orifice means, said support means having a passage therethrough to place said plenum chamber in communication with said pocket in by-pass of said orifice means in said plate.

5. A universal suction head device for transporting a load, such as a single article or a group of discrete articles, said device consisting of a plenum chamber having a unitary wall presented toward the load and formed with a plurality of holes, a unitary grid structure carried by said chamber wall at the load side and having wall elements crossing each other to form pockets isolating each hole from the others, said grid structure being formed of yieldable material so that said material will more or less conform to the shape of the load with which it is engaged, and suction control means mounted in each pocket of said grid structure over each hole, each control means including plug support means carried centrally in each pocket and having an air flow passage therein, and valve means movable on and guided by said plug support means between a position shutting off air flow from ambient to said hole and a position in which said hole is open to air flow, said plug means being formed with a passage therethrough to maintain communication between said plenum chamber and ambient.

6. A suction head assembly for transporting a load from place to place under a pressure differential gripping effect, said assembly including: a plenum chamber having a wall of an area to cover the load to be transported and a plurality of ports distributed in said wall; a grid member on said wall presented toward the load and formed to provide a plurality of pockets for isolating said ports from each other; pressure drop control means in each pocket including a plate having at least one orifice therein, a valve element for said orifice and guide means operably mounting said valve element on said plate for movement to cover and uncover said orifice, said guide means being removably engaged on said orifice plate and formed with a valve element support spaced from said orifice plate a distance to determine the limit of movement of said valve element to the orifice uncovered position and having a passage therein communicating between said plenum chamber and said pocket in by-pass of said plate orifice; and fan means communicating with and operable to reduce the pressure in said plenum chamber and initiate a flow of air through said plate orifice to suck up said valve elements over the respective orifices and to conserve the negative pressure in said plenum chamber.

7. A suction head assembly for transporting a load from place to place under a pressure differential gripping effect, said assembly including: a plenum chamber having a wall of an area to cover the load to be transported and a plurality of ports distributed in said wall; a grid member on said wall presented toward the load and formed to provide a plurality of pockets for isolating said ports from each other; pressure drop control means in each pocket including a plate removably mounted in said pocket and having at least one orifice therein, a valve element for said orifice and guide means removably mounted in said orifice plate and operably mounting said valve element on said plate for movement to cover and uncover said orifice, seal means disposed in said pocket between said orifice plate and said plenum chamber wall, said seal means spacing said orifice plate from said wall to provide an air flow passage therebetween, said guide means having a passage therein communicating between said plenum chamber and said pocket in by-pass of said plate orifice; and fan means communicating with and operable to reduce the pressure in said plenum chamber and initiate a flow of air through said plate orifice to suck up said valve elements over the respective orifices and to conserve the negative pressure in said plenum chamber.

8. A suction head assembly for transporting a plurality of individual loads from place to place under a pressure differential gripping effect applied to each load, said assembly including: a plurality of walls together forming a plenum chamber, one wall of said chamber having a plurality of ports therein distributed over the area of said one wall, a grid member composed of a plurality of elements in crossing relation to separate and form the sides of pockets surrounding said ports, fan means communicating with said plenum chamber to draw a vacuum therein, and means in each of said pockets to control the opening and closing of the port surrounded by said elements, said means consisting of a plate in the pocket having at least one orifice therein, a valve element operably mounted in said pocket to move between port open and closed positions, said valve element being of less area than said pocket, and means to guide said valve element and formed with a passage in by-pass of said valve and open between said plenum chamber and ambient, said guide means being carried by said orifice plate and said valve element being movable into port closing position upon operation of said fan and no load over said grid pocket.

* * * * *